United States Patent
Hale

(10) Patent No.: US 9,314,129 B2
(45) Date of Patent: Apr. 19, 2016

(54) HEAD ASSEMBLY FOR BREWING APPARATUS

(71) Applicant: Robert Hale, Scarborough (CA)

(72) Inventor: Robert Hale, Scarborough (CA)

(*) Notice: Subject to any disclaimer, the term of this patent is extended or adjusted under 35 U.S.C. 154(b) by 252 days.

(21) Appl. No.: 13/957,410

(22) Filed: Aug. 1, 2013

(65) Prior Publication Data

US 2014/0033927 A1 Feb. 6, 2014

Related U.S. Application Data

(60) Provisional application No. 61/742,037, filed on Aug. 2, 2012.

(51) Int. Cl.
| | |
|---|---|
| *A47J 31/00* | (2006.01) |
| *A47J 31/40* | (2006.01) |
| *A47J 31/36* | (2006.01) |
| *A47J 31/44* | (2006.01) |

(52) U.S. Cl.
CPC ............ *A47J 31/407* (2013.01); *A47J 31/3623* (2013.01); *A47J 31/3676* (2013.01); *A47J 31/4407* (2013.01)

(58) Field of Classification Search
CPC . A47J 31/3695; A47J 31/368; A47J 31/3676; A47J 31/3623; A47J 31/3628
USPC ........ 99/295, 289 R; 220/263, 262, 324, 326, 220/833, 810, 835, 826, 827
See application file for complete search history.

(56) References Cited

U.S. PATENT DOCUMENTS

| | | | | |
|---|---|---|---|---|
| 6,786,353 | B2 * | 9/2004 | Gourand | 220/835 |
| 6,994,015 | B2 * | 2/2006 | Bruinsma | 99/289 R |
| 7,131,369 | B2 * | 11/2006 | Gantt et al. | 99/289 R |
| 7,320,274 | B2 * | 1/2008 | Castellani | 99/295 |
| 7,631,594 | B2 * | 12/2009 | Chen et al. | 99/289 R |
| 7,779,750 | B2 * | 8/2010 | Colman et al. | 99/295 |
| 8,701,548 | B2 * | 4/2014 | Denisart et al. | 99/289 R |

FOREIGN PATENT DOCUMENTS

| | | |
|---|---|---|
| WO | PCT/EP 2006/066972 | 10/2005 |
| WO | WO/2007/045553 A1 | 10/2006 |

* cited by examiner

*Primary Examiner* — Reginald L Alexander
(74) *Attorney, Agent, or Firm* — Breneman & Georges

(57) ABSTRACT

According to embodiments described in the specification, a head assembly for a brewing apparatus is described. The head assembly includes a lid portion coupled to a fixed base portion and movable between open and closed positions; a lock coupled to the lid portion and slideable between locked and unlocked positions; a lever with a first end connected to the lock, an axis point connected to the lid portion, and a second end; and a cover movably coupled to the lid portion and abutting the second end of the lever, such that pressure on the cover rotates the lid portion to the closed position, and rotates the lever so as to slide the lock into the locked position.

20 Claims, 17 Drawing Sheets

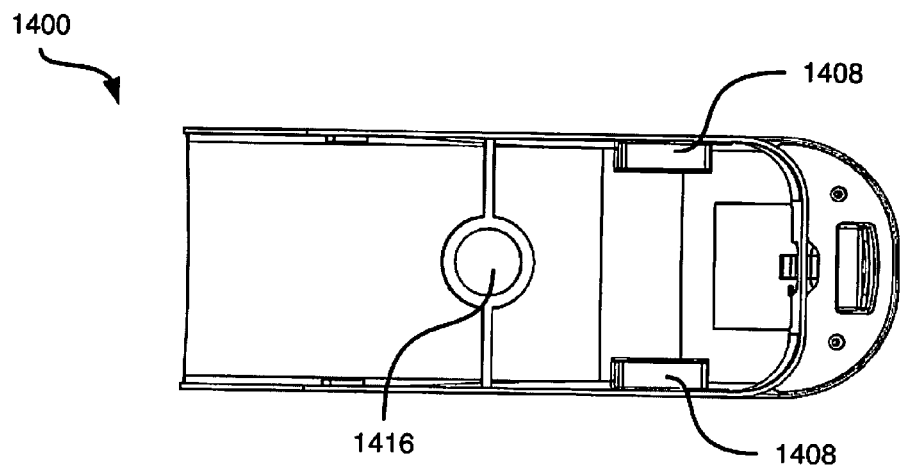
Figure 14A
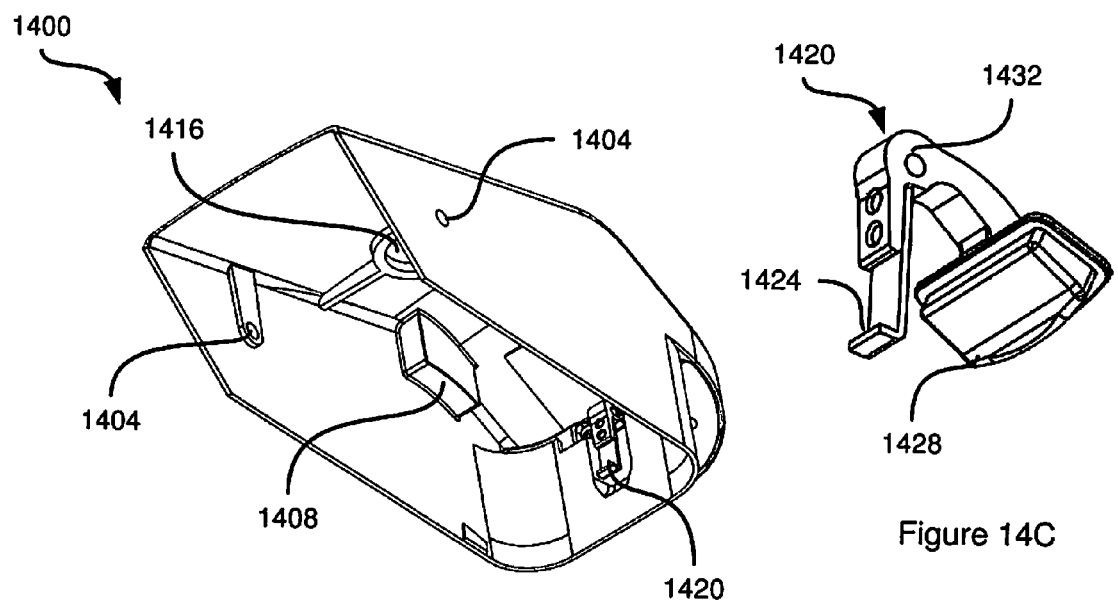
Figure 14B
Figure 14C

HEAD ASSEMBLY FOR BREWING APPARATUS

CROSS REFERENCE TO RELATED APPLICATIONS

The subject matter of this application is related to the subject matter of U.S. application Ser. No. 14/514,342 filed Oct. 14, 2014 and also titled, Head Assembly For Brewing Apparatus.

FIELD

The specification relates generally to machines for brewing beverages, and specifically to a head assembly for a brewing apparatus.

BACKGROUND

Single-serving beverage dispensing machines, or brewing apparatuses, are commonly used in office and residential settings. Such machines provide quick, convenient and freshly prepared beverage servings. In general, beverages are produced in such machines from disposable cartridges containing soluble products such as coffee grounds or tea leaves.

The brewing process in such machines generally involves the injection of hot water under pressure into the cartridge, through the beverage product, and out of the cartridge into a cup or mug. This process necessitates the placement of a cartridge in the machine, and may require the ejection of a previous, spent cartridge. In addition, the new cartridge generally must be punctured in two locations—one to inject water, and the other to extract brewed beverage. These various mechanical operations can require a user to make multiple movements and involve complex structures, resulting in poor ergonomics and increased risk of mechanical failure.

BRIEF DESCRIPTIONS OF THE DRAWINGS

Embodiments are described with reference to the following figures, in which:

FIGS. 14A, 14B and 14C depict a cover and latch of the head assembly of FIG. 12, according to a non-limiting embodiment

DETAILED DESCRIPTION OF THE EMBODIMENTS

Figure 1:
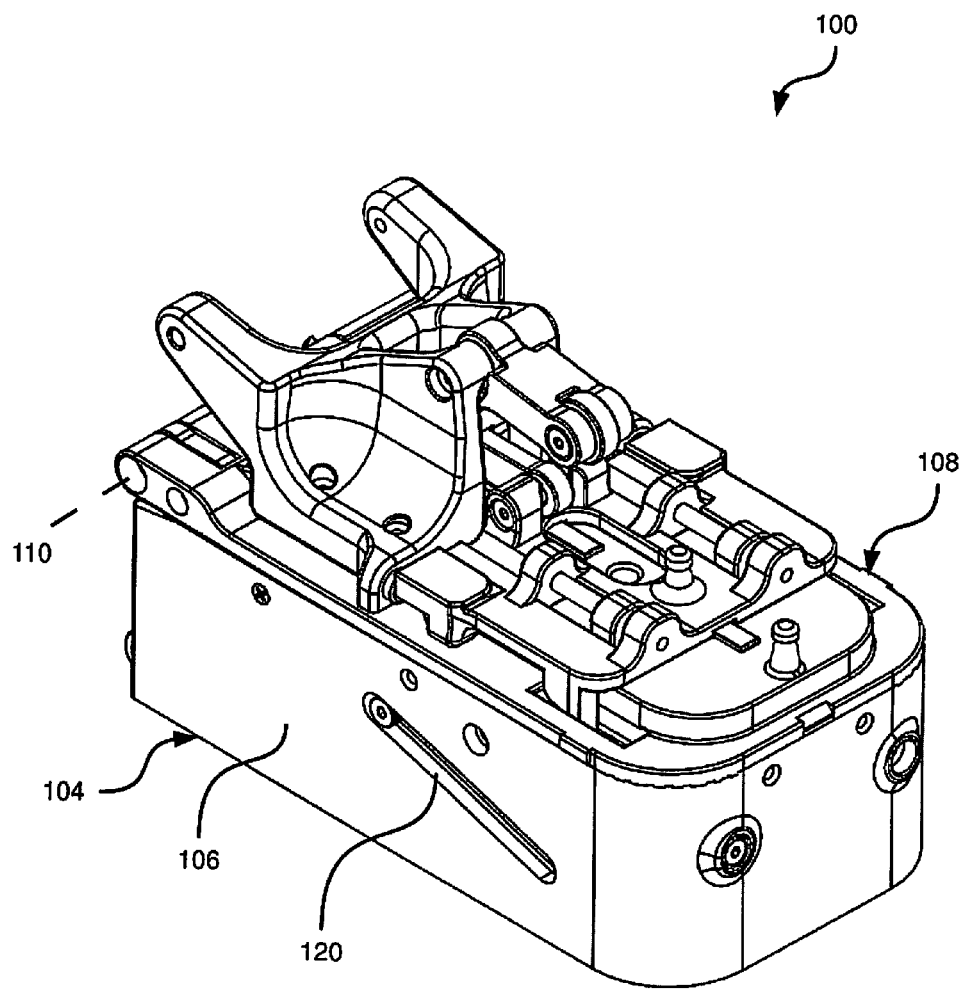
FIG. 1 depicts an isometric view of a head assembly for a brewing apparatus, according to a non-limiting embodiment.

FIG. 1 depicts a brewing apparatus head assembly 100, also referred to herein as head 100. Briefly, a brewing apparatus receives beverage cartridges, containing, for example, dried ground coffee, tea, juice crystals, soup mix and the like. Having received a cartridge, the apparatus injects water at various temperatures and pressures (depending on the beverage being brewed) into the cartridge and collects brewed liquid from the cartridge, for dispensing into a cup. Some components of the brewing apparatus are not shown in FIG. 1, such as a water reservoir, power source and the like. It is contemplated that head 100 can be used in conjunction with any suitable forms of such components, as will occur to those skilled in the art. In general, head 100 includes the structures for receiving cartridges, injecting water and collecting brewed liquid.

In the discussion below, terms such as "upper", "lower" and the like are made in reference to the apparatus in the installed, ready-to-use position, which is reflected in the Figures.

Head 100 includes a base portion 104 having an outer wall 106 defining the sides thereof, and a lid portion 108 coupled to base portion 104. Base portion 104 is fixed (e.g. immovably attached to the remainder of the apparatus), while lid portion 108 is movable. In particular, lid portion 108 is rotatable between an open position for receiving a cartridge, and a closed position for sealing the cartridge within the apparatus (specifically, within head 100). Lid portion 108 is rotatable about an axis 110, which can be provided by a hinge connecting lid portion 108 to base portion 104.

Figure 2:
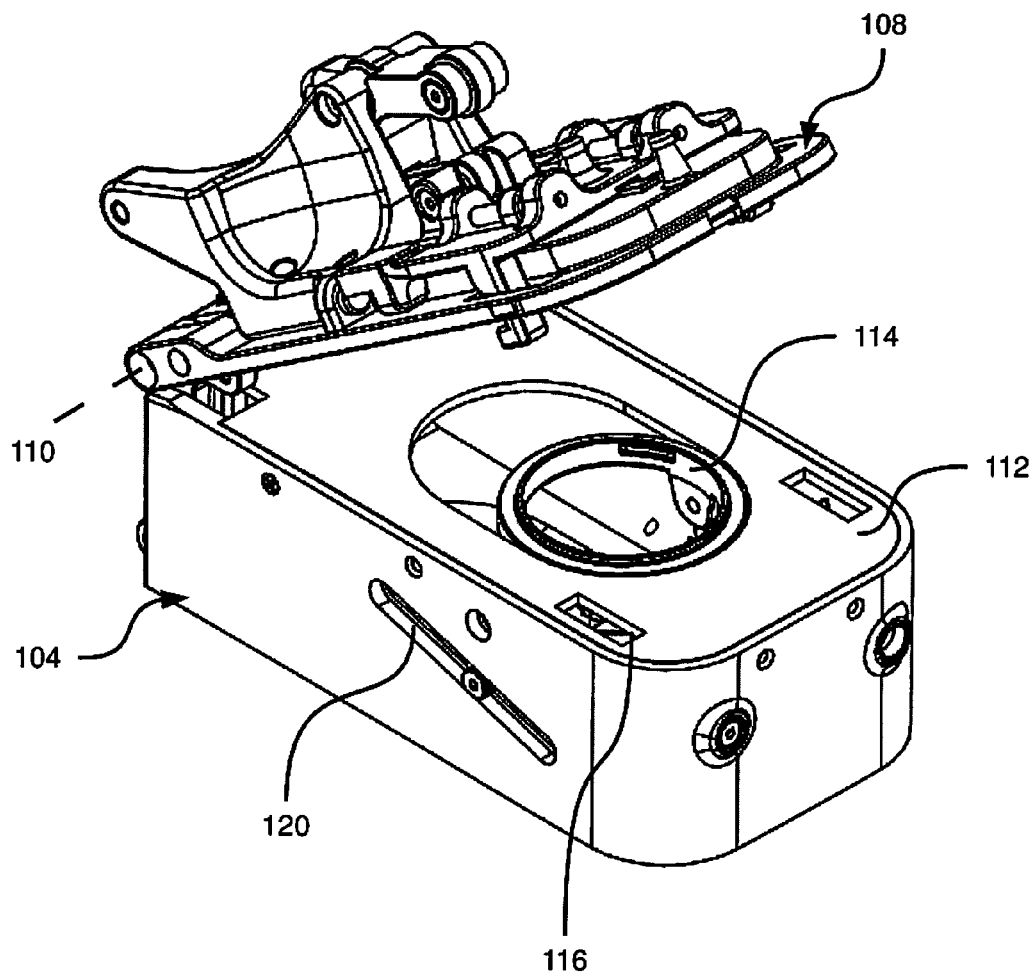
FIG. 2 depicts an isometric view of the head assembly of FIG. 1 in an open position, according to a non-limiting embodiment.

In FIG. 1, lid portion 108 is shown in the closed position. Turning to FIG. 2, lid portion 108 is shown in the open position. As seen in FIG. 2, lid portion 108 is rotated about axis 110 so as to swing upwards from base portion 104, exposing an upper surface 112 of base portion 104. Upper surface 112 has an opening defined therein for receiving a cartridge (not shown) in a cartridge holder 114. Thus, when lid portion 108 is in the open position, base portion 104 is able to receive a cartridge, and when lid portion 108 is in the closed position, the cartridge, seated within cartridge holder 114, is sealed within head 100. Lid portion 108 carries an injection pin (not shown) for puncturing a cartridge in holder 114, and can also include a seal (e.g. a rubber or silicone ring) around the injection pin. The injection pin, in the present example, has a flat tip rather than a pointed tip. However, it is contemplated that a wide variety of injection pin designs can be used.

Base portion 104 and lid portion 108 can be manufactured from any suitable combination of materials, including plastics (e.g. ABS), metals (e.g. aluminum) and the like. As will be discussed in detail below, lid portion 108 is configured to transition from the open position to the closed position and to lock onto, or engage with, base portion 104, in response to a force applied to lid portion 108 by way of a single movement (for example, of a user's hand).

Figure 3:
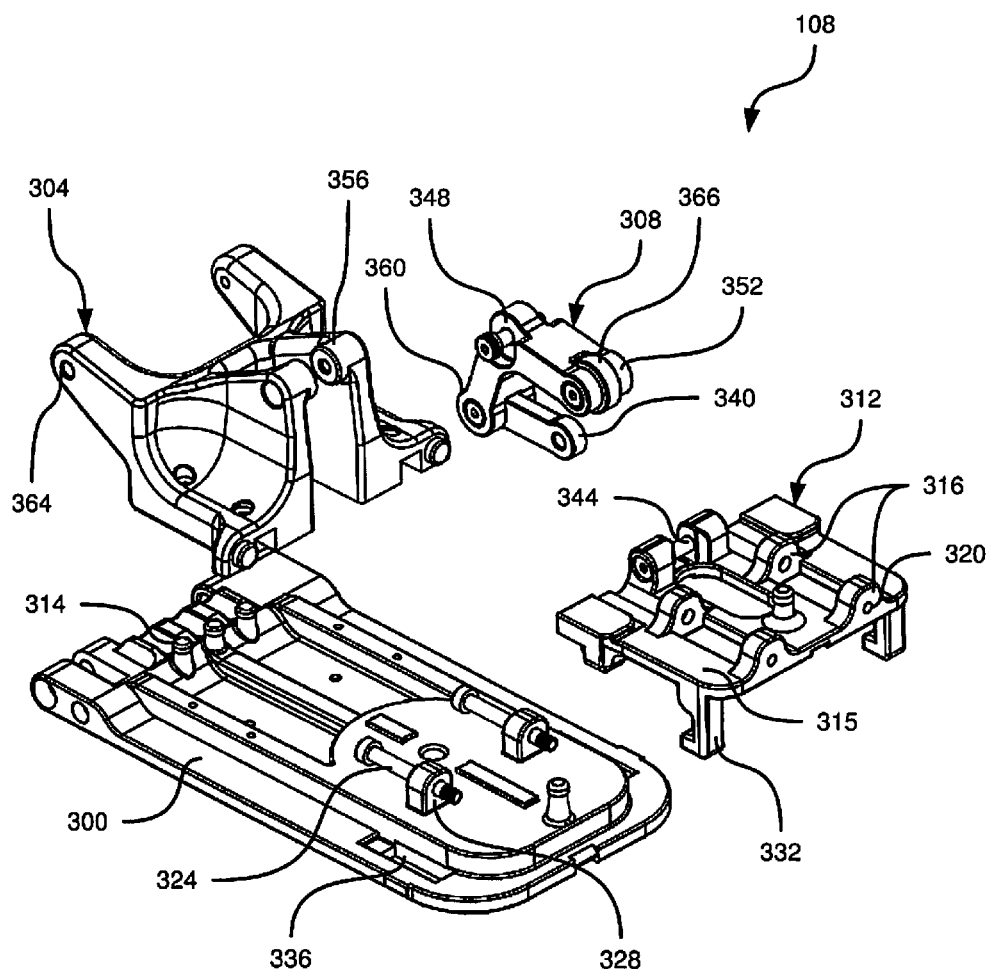
FIG. 3 depicts an exploded isometric view of the lid portion of the head assembly of FIG. 1, according to a non-limiting embodiment.

Turning now to FIG. 3, an exploded view of lid portion 108 is shown. Lid portion 108 includes a base plate 300, a tower 304, a lever 308 and a sliding lock 312. As can be seen from FIGS. 1 and 2, base plate 300 connects to base portion 104 when head 100 is fully assembled. In addition, base plate 300 supports tower 304, level 308 and lock 312. Base plate 300 can include one or more (three are shown in FIG. 3) raised pylons 314 for anchoring springs connected to base portion 104. The springs (not shown) bias lid portion towards the open position.

Lock 312 is slideably coupled to base plate 300. The nature of the coupling is not particularly limited. In the present example, lock 312 includes a substantially planar member 315 supporting two pairs of raised members 316 (a first pair is identified in FIG. 3), each raised member defining an eyehole 320 therethrough. Planar member 315 is arranged, in the assembled configuration, substantially parallel to base plate 300. A bar 324 is fastened to each pair of raised members 316. For example, one or both of the eyeholes 320 can be threaded, and an end of bar 324 can include corresponding threads, as seen in FIG. 3. Further, base plate 300 includes one or more raised members 328 for each bar 324—each raised member 328 includes an eyehole for slideably receiving bar 324.

Thus, when lid portion 108 is assembled, lock 312 is coupled to base plate 300 as a result of bars 324 protruding through raised members 328 and being fixed to raised members 316. Lock 312 can therefore slide in the direction of the longitudinal axis of bars 324, as bars 324 slide through raised members 328. In other words, lock 312 is configured to slide in a fixed direction in a plane substantially parallel to base plate 300.

Lock 312 is slideable between a locked position for engaging base portion 104 when lid portion 108 is in the closed position, and an unlocked position for releasing base portion 104. In the locked position, lock 312 is displaced along base plate 300 towards tower 304 and the "rear" end of base plate 300, where lid portion 108 connects to base portion 104. In the unlocked position, lock 312 is displaced towards the opposing "front" end of base plate 300 and away from tower 304.

Figure 4:
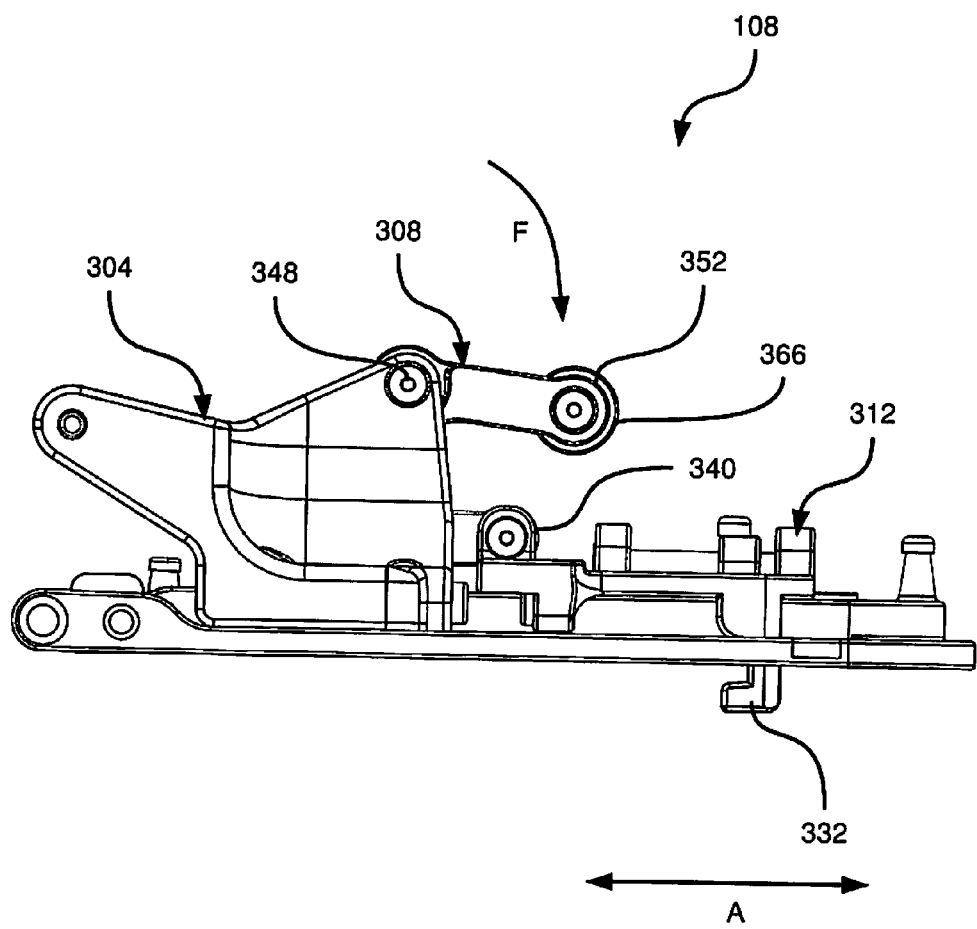
FIG. 4 depicts a side elevation view of the lid portion of the head assembly of FIG. 1, according to a non-limiting embodiment.

As seen in FIG. 3, lock 312 includes a pair of hooks 332 depending from planar member 315 of lock 312. Base plate 300, meanwhile, includes a corresponding pair of apertures 336 defined therethrough for receiving hooks 332. Referring now to FIG. 4, a side view of lid portion 108 is shown, in which a hook 332 can be seen protruding through base plate 300 via an aperture 336. As will now be apparent to those skilled in the art, when lock 312 transitions between the locked and unlocked positions by sliding in direction A, hooks 332 will also slide in direction A and engage corresponding structures on base portion 104.

In particular, referring briefly to FIG. 2, upper surface 112 of base portion 104 has an opening 116 defined therethrough corresponding to each hook 332. When lock 312 is in the unlocked position, hooks 332 extend through openings 116 but do not engage base portion 104 (that is, hooks 332 can be readily removed from openings 116). When lock 312 is in the locked position, however, hooks 332 extend through openings 116 and underneath upper surface 112, such that hooks 332 cannot be removed from openings 116 until lock 312 returns to the unlocked position.

It is contemplated that hooks 332 can include slanted surfaces at the ends thereof, so as to pull lid portion 108 towards base portion 104 as lock 312 slides into the locked position. As a result, the pressure of the seal between lid portion 108 and base portion 104 can be increased. In the present example, the seal generated between lid portion 108 and a cartridge within holder 114, when lid portion 108 is in the closed position, can withstand pressure of about 50 PSI.

Returning to FIG. 3, the movement of lock 312 between the locked and unlocked positions is provided by lever 308. Lever 308 has a first end 340 for connecting to lock 312. In the present example, a pin 344 is received through the opening at first end 340, although it is contemplated that any suitable means of connecting first end 340 to lock 312 may be used. Lever 308 also includes an axis point 348, about which lever 308 can pivot, and a second end 352.

Lever 308 is supported by tower 304. In particular, axis point 348 is rotatably coupled to tower 304 at support 356 (for example, by way of a screw or pin received through each side of support 356 and through an opening at axis point 348). Additionally, lever 308 can include two articulating members, as shown in FIG. 3, with a first member defining first end 340, and a second member defining axis point 348 and second end 352. As seen in FIG. 3, the first and second members can rotate relative to one another at joint 360.

Turning again to FIG. 4, the operation of lever 308 will now be apparent to those skilled in the art. When a force is applied to second end 352 of lever 308, substantially in the direction labelled "F", second end 352 is displaced downwards and lever 308 rotates about axis point 348. The rotation causes first end 340 to pull "back" towards tower 304, thus sliding lock 312 into the locked position. Conversely, when the force applied to second end 352 is removed, lever 308 can rotate in the opposite direction to slide lock 312 "forwards" (to the right in FIG. 4) into the unlocked position. In some examples (not shown), one or both of lever 308 and lock 312 can be biased towards the unlocked position by springs.

Figure 5:
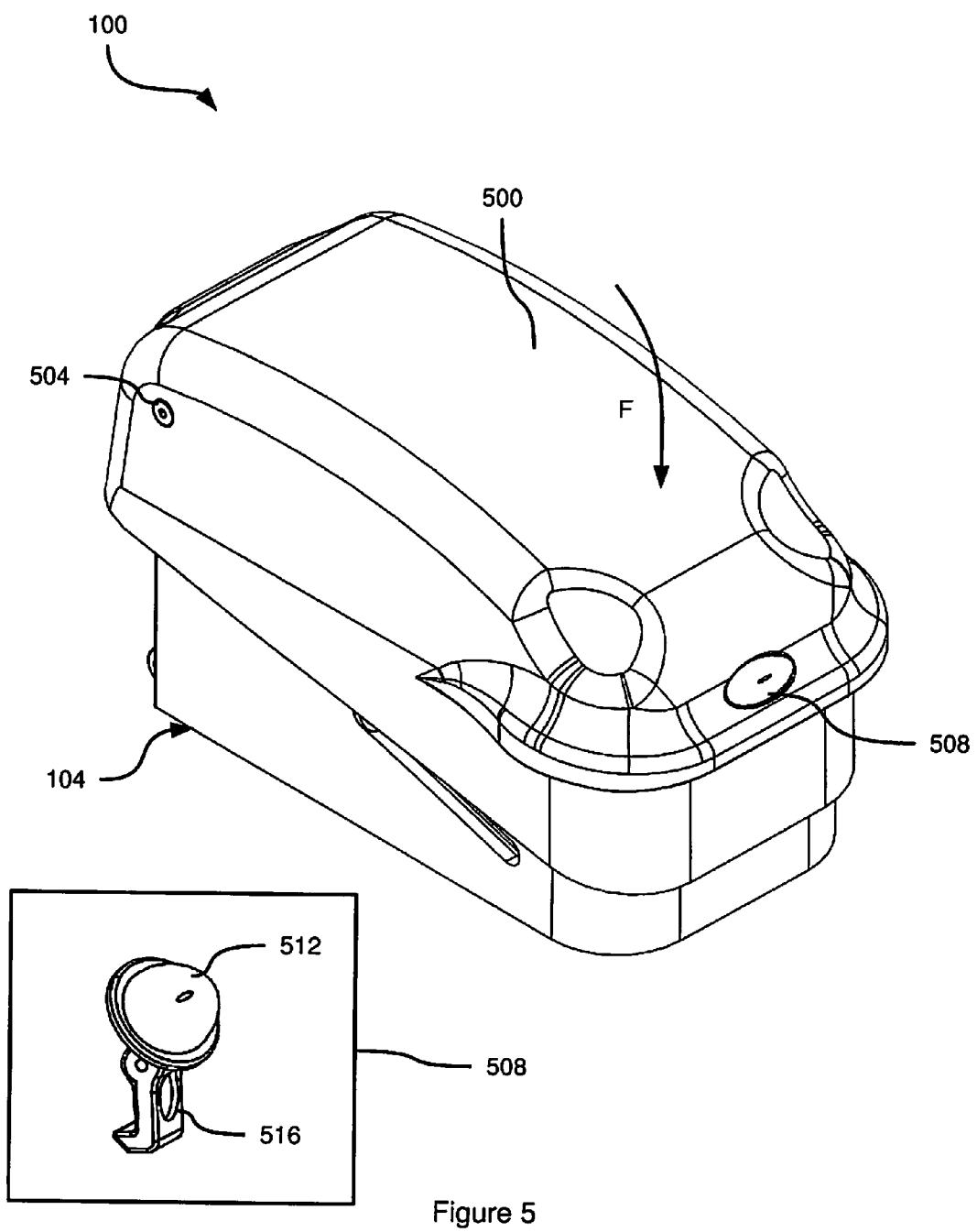
FIG. 5 depicts an isometric view of the head assembly of FIG. 1 assembled with a cover, according to a non-limiting embodiment.

In order to facilitate the application of a force to second end 352, head 100 also includes a cover. Referring now to FIG. 5, head 100 is shown in an assembled state, include a cover 500. Cover 500, also referred to as a shell, substantially encloses lid portion 108, and is rotatably coupled to lid portion 108. For example, a fastener 504 (and an opposing fastener on the other side of cover 500, not shown) can extend through cover 500 to be received in tower 304 (in particular, in an opening 364, shown in FIG. 3).

In operation, a force in the direction F (as also seen in FIG. 4) is applied to the upper part of cover 500, when lid portion 108 is in the open position. As a result, the interior of cover 500 contacts second end 352 and causes lid portion 108 to travel to the closed position, as shown in FIG. 5 (the force required to rotate lever 308 is high enough that lever 308 does not rotate before lid portion 308 is in the closed position).

Once lid portion 108 is in the closed position, continuing application of the force rotates cover 500 about an axis defined by fasteners 504, such that cover 500 continues to "close" until it reaches its closed position. Thus, cover 500 continues to press downwardly on second end 352 after base plate 300 has contacted upper surface 112 of base portion 104 (that is, after lid portion 108 has reached its closed position).

This causes lever 308 to rotate and pull lock 312 into the locked position, in which hooks 332 engage base portion 104 and prevent lid portion 108 and base portion 104 from being separated. Second end 352 includes a bearing surface, which can be provided by a roller bearing 366 (shown in FIGS. 3 and 4) for facilitating motion of the interior of cover 500 against lever 308. Other structures can also provide the bearing surface instead of roller bearing 366, such as a surface provided with a low-friction material (not shown).

Cover 500 can be maintained in the closed position by a latch 508, shown in detail in the inset of FIG. 5. Latch 508 comprises a button 512 accessible from the outside of cover 500, and a latch arm 516 internal to cover 500. Latch arm 516 engages upper surface 112 (for example, by way of a lip formed on upper surface 112), and pressing button 512 rotates latch arm 516 away from upper surface 112 so as to release cover 500 (and, by extension, lid portion 108).

Figure 6:
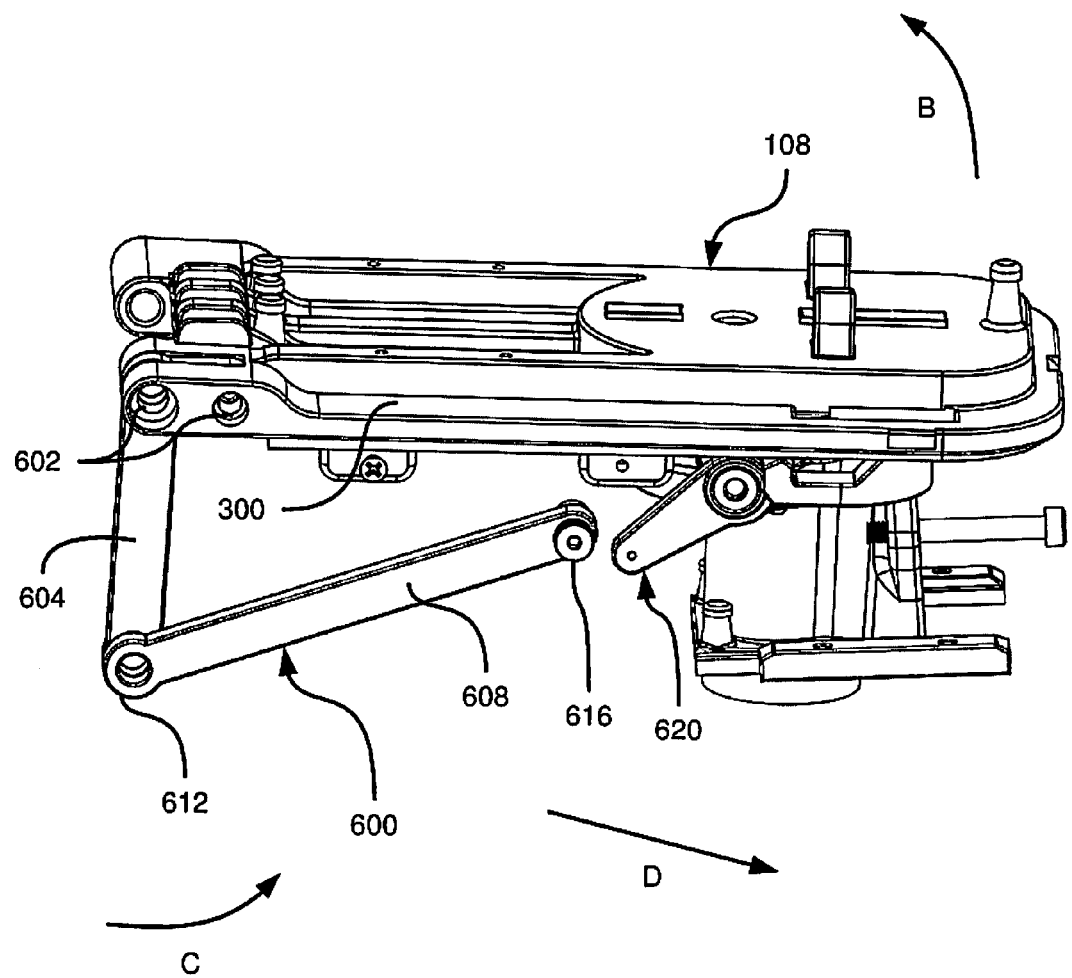
FIG. 6 depicts certain components of the lid portion and base portion of the head assembly of FIG. 1, according to a non-limiting embodiment.

As will now be discussed in connection with FIG. 6, head 100 is also configured to eject a spent cartridge from cartridge holder 114 when lid portion 108 moves from the closed position to the open position. Lid portion 108 is shown in FIG. 6, excluding tower 304, lever 308 and lock 312 for illustrative purposes. Some internal components of base portion 104 are also shown, though outer wall 106 of base portion 104 is omitted.

As seen in FIG. 6, base plate 300 of lid portion 108 is rigidly coupled to an articulated arm 600. In the present example, the rigid coupling is accomplished by way of a pair of holes 602 extending from the outer edge of base plate 300 through the proximal end (that is, the end closest to base plate 300) of arm 600. Fasteners, such as bolts or screws, are inserted through holes 602 to rigidly couple arm 600 to base plate 300. It will now be apparent that other suitable arrangements of holes and fasteners can also serve to couple arm 600 and base plate 300. Other means of coupling arm 600 to base plate 300 are also contemplated. For example, arm 600 can be glued or welded to base plate 300, or arm 600 can be integrally formed with base plate 300.

Arm 600 includes a first member 604, and a second member 608, rotatably coupled to each other at a joint 612. A distal end 616 of arm 600 (that is, the end furthest from the connection to lid portion 108) includes a fastener, such as a bolt or screw, or other protuberance which travels in a guide channel in outer wall 106 of base portion 104. The guide channel is not shown in FIG. 6, but can be seen in FIGS. 1 and 2, labelled 120. Joint 612 can also include a protuberance which travels in a groove on the inner surface of base portion 104 (not shown).

Thus, due to the rigid connection between arm 600 (specifically, first member 604 of arm 600) and base plate 300, when lid portion 108 moves to the open position in the direction labelled "B", joint 612 is caused to move in the direction "C" and distal end 616 is caused to move, constrained by guide channel 120, in the direction "D". As a result of moving in direction "D", distal end 616 will strike a dog 620, as will be discussed in greater detail in connection with FIG. 7.

Figure 7:
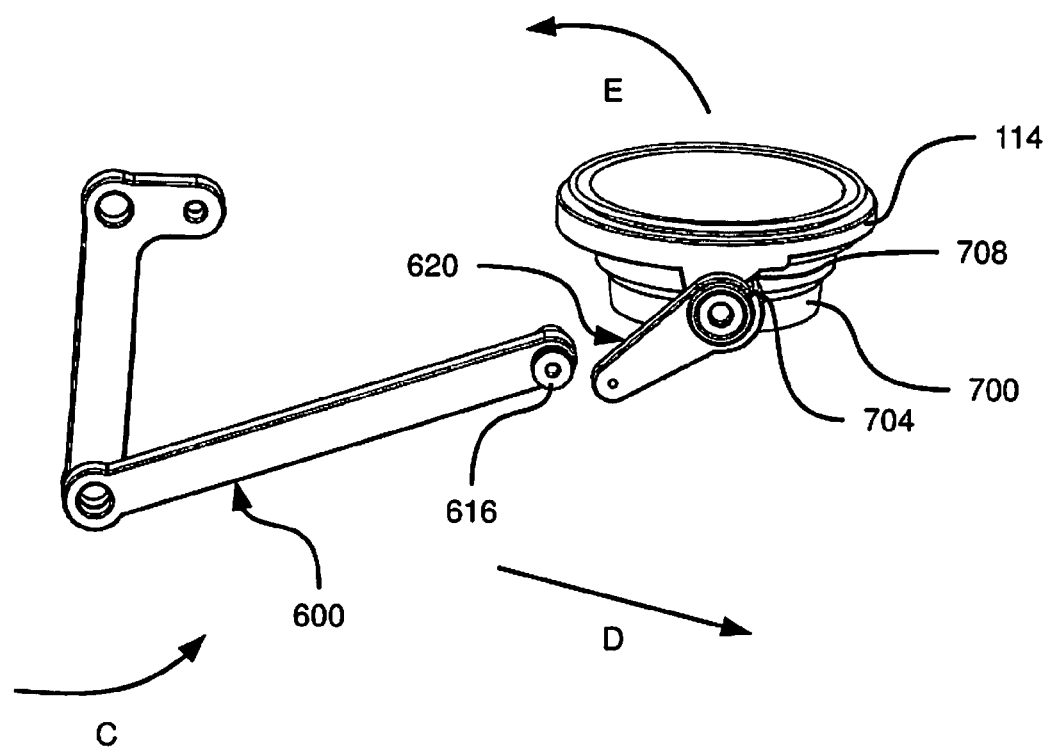
FIG. 7 depicts certain components of the base portion of the head assembly of FIG. 1, according to a non-limiting embodiment.

Referring now to FIG. 7, arm 600 and cartridge holder 114 are shown in isolation from the remainder of head 100. Cartridge holder 114 is shown holding a cartridge 700. As discussed above, the opening of lid portion 108 causes distal end 616 of arm 600 to travel in direction "D" and strike dog 620. Dog 620 is rotatably coupled to holder 114, and includes a rim 704 configured to strike a surface 708 of holder 114 so as to prevent further rotation of dog 620 relative to holder 114 in one direction. In other words, dog 620 is prevented from rotating relative to holder 114 in a counter-clockwise direction as shown in FIG. 7 once rim 704 has come into contact with surface 708. However, dog 620 can rotate freely relative to holder 114 in a clockwise direction as shown in FIG. 7. In some examples (not shown), dog 620 can be articulated, such that a first portion is fixed to cartridge holder 114, and a second portion is rotatably coupled to the first portion (rather than the entirety of dog 620 being rotatable relative to holder 114).

When distal end 616 strikes dog 620, therefore, rim 704 will contact surface 708 and dog 620 will be prevented from further rotation relative to holder 114. However, holder 114 is rotatably mounted within base portion 104, and rotates about the same axis as dog 620. Therefore, once rim 704 has contacted surface 708, as distal end 616 continues to travel in direction "D", both dog 620 and holder 114 rotate together in direction "E".

Figure 8A:
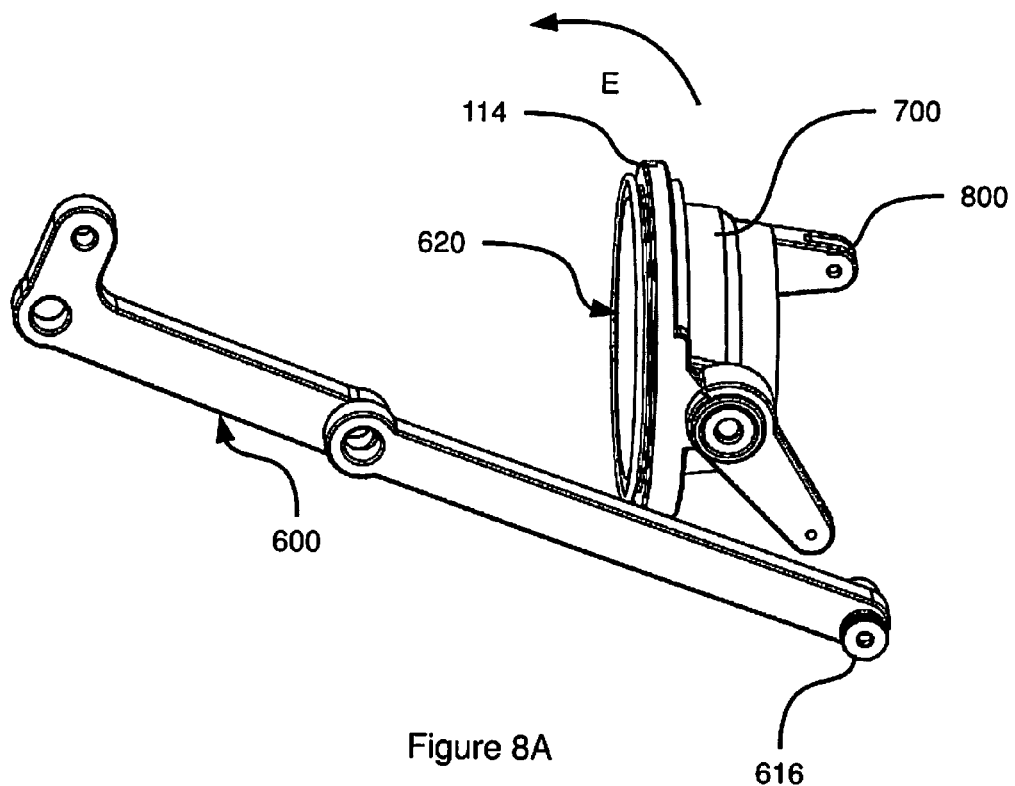
FIGS. 8A and 8B depict the components of FIG. 7 in various positions, according to a non-limiting embodiment.

Referring now to FIG. 8A, arm 600 is shown following the opening of lid portion 108. As a result of distal end 616 travelling through guide channel 120, distal end 616 has caused dog 620 and holder 114 to rotate so as to tip cartridge 700 out of holder 114. The ejected cartridge can be collected, for example in a storage bin (not shown) connected to base portion 104.

Figure 8B:
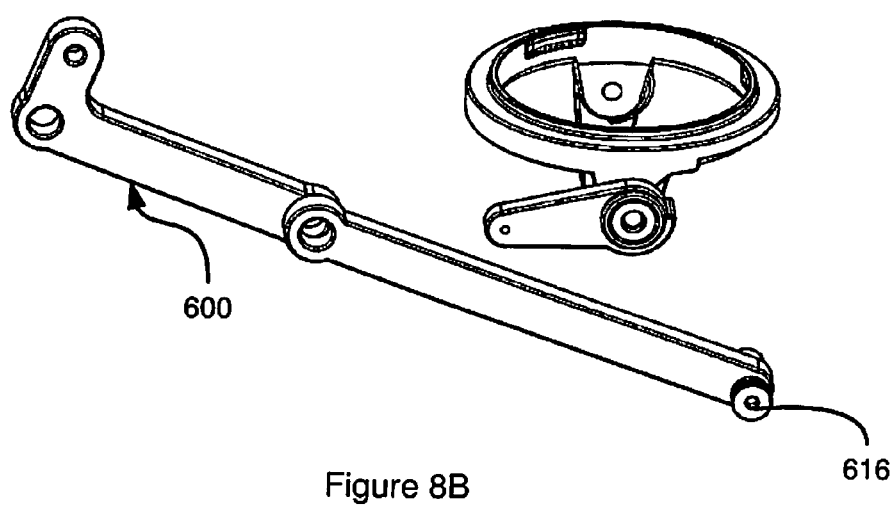

It is contemplated that the axis of rotation of holder 114 can be placed off-centre (in the present example, closer to the "back" of head 100, where lid portion 108 and base portion 104 connect) so as to facilitate the rotation of holder 114 back to a resting position (that is, in a direction opposite to "E") for receiving a new cartridge. To that end, a weight 800 can also be coupled to holder 114 to facilitate such rotation. As seen in FIG. 8B, second end 616 descends away from holder 114 and dog 620, allowing holder 114 to return to the resting position. Dog 620 is free to rotate in the clockwise direction shown, in order to allow distal end 616 of arm 600 to return to the position shown in FIG. 7 as lid portion 108 is moved into the closed position.

It will now be apparent to those skilled in the art that other mechanisms are also suitable for implementing the cartridge ejection discussed above. For example, instead of dog 620 being rotatable, dog 620 can be fixed to holder 114 and distal end 616 can include a member that is rotatable in one direction only. Therefore, distal end 616 can tip holder 114 as lid portion 108 is opened and the member contacts dog 620, but will not disturb holder 114 as lid portion is closed again because the member at distal end 616 will rotate upon contact with dog 620, to allow the member to pass dog 620 without causing holder 114 to rotate.

Figure 9:
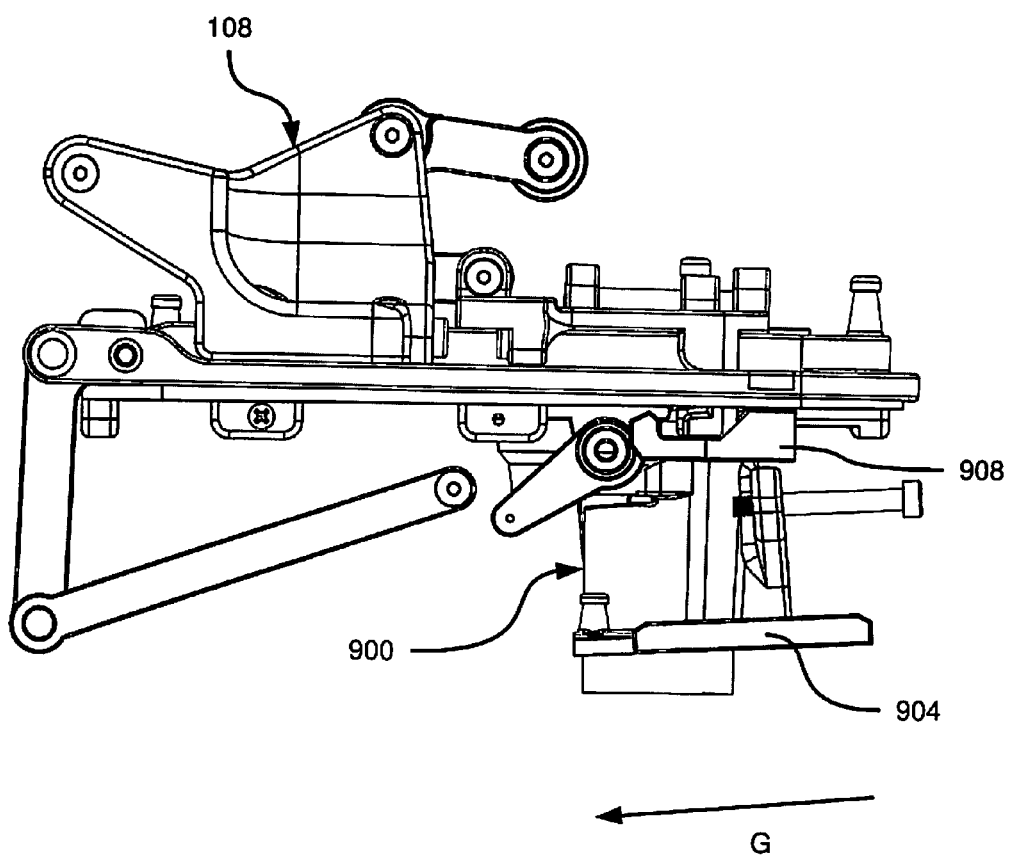
FIG. 9 depicts a side elevation view of certain components of the lid portion and base portion of the head assembly of FIG. 1, according to a non-limiting embodiment.

Referring now to FIG. 9, head 100 is also configured to ready a newly received cartridge for brewing as lid portion 108 is closed. In particular, head 100 includes a shuttle 900 mounted within base portion 104. Shuttle 900 is slideable within base portion 104 along rails 904 (one shown in FIG. 9) and includes a yoke 908 configured to engage hooks 332 of lock 312. Thus, as lock 312 slides to the locked position, as discussed above, shuttle 900 slides from a resting position in direction "G" to a brewing position, towards holder 114 and the cartridge supported therein.

Figure 10:
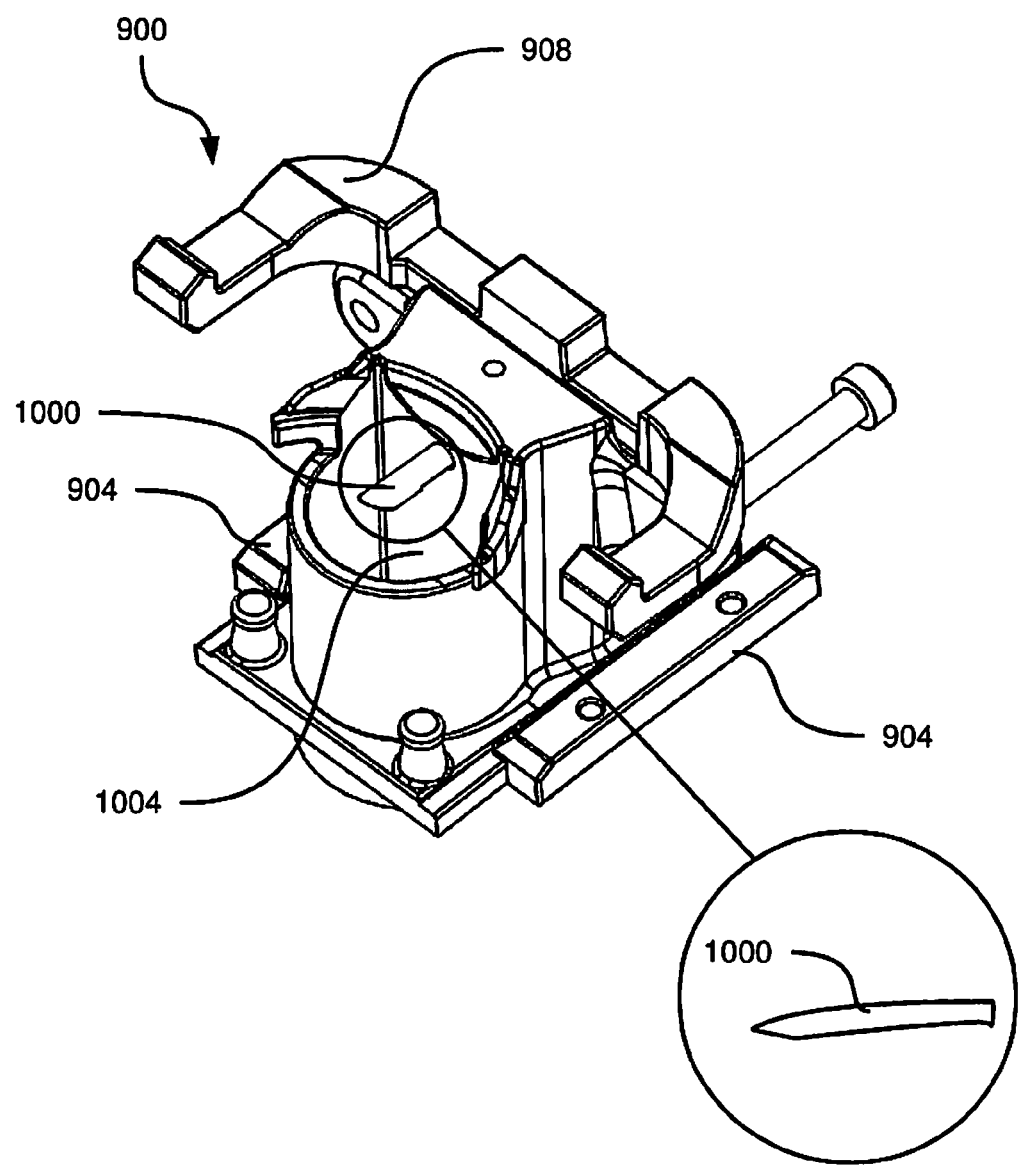
FIG. 10 depicts an isometric view of a shuttle component of the head assembly of FIG. 1, according to a non-limiting embodiment.

Referring now to FIG. 10, shuttle 900 is shown in more detail. In particular, both rails 904 are shown in FIG. 10, as is yoke 908. It is contemplated that yoke 908, or any other portion of shuttle 900, can be coupled to one or more springs for biasing shuttle 900 towards the resting position (corresponding with the open position of lid portion 108).

Shuttle 900 supports a hollow extraction pin 1000 for puncturing cartridge 700 and allowing brewed liquid to exit cartridge 700. The brewed liquid is guided by a channel 1004 into a cup or other receptacle (not shown) below shuttle 900.

As shown in FIG. 9, shuttle 900 does not slide in parallel with base plate 300 of lid portion 108. Instead, shuttle 900 slides on an angle with respect to base plate 300 (the direction "G" is not horizontal as illustrated in FIG. 9, while base plate 300 is horizontal), due to the angle of rails 904. The angle is not particularly limited, and in general is selected in order to prevent extraction pin 1000 from puncturing a filter within cartridge 700. Filters are often conical or triangular in shape within cartridges, and thus extraction pin 1000 is less likely to puncture the filter if it punctures cartridge near the bottom thereof.

Returning to FIG. 10, extraction pin 1000 can also be bent downwards, away from lid portion 108 such that it punctures cartridge 700 closer to the bottom thereof, as shown in the magnification of extraction pin 1000. Further, a set screw (not shown) can be provided to adjust the distance that extraction pin 1000 extends from shuttle 900.

Therefore, the transition of lid portion 108 from the closed position to the open position serves to eject a spent cartridge, and the following transition of lid portion 108 back to the closed position serves to lock lid portion 108 and base portion 104 together and puncture a newly inserted cartridge (both by the injection pin and extraction pin 1000), readying head 100 for brewing.

Variations to the above are contemplated. For example, holder 114 can be removable, such that a variety of different holders can be used with head 100, for accommodating a variety of cartridge configurations (such as soft pod cartridges, shelled cartridges, and the like).

Figure 11:
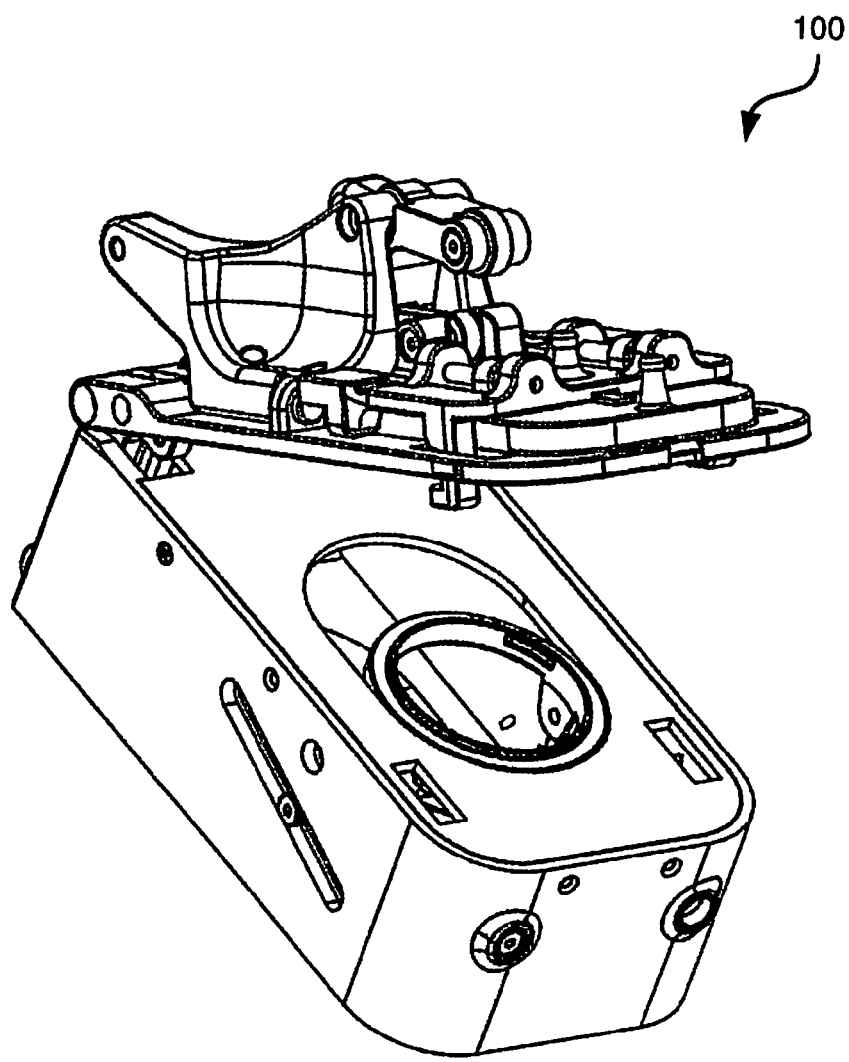
FIG. 11 depicts an isometric view of the head assembly of FIG. 1 in an installed orientation, according to a non-limiting embodiment.

In addition, although FIGS. 1 and 2 show head 100 in a substantially horizontal orientation (that is, upper surface 112 of base portion 104 is substantially horizontal), it is contemplated that in use, head 100 can be installed on the brewing apparatus at an angle, to facilitate the placement of cartridge 700 into holder 114. For example, head 100 can be installed such that upper surface 112 is at an angle of between about −20° and about −35° from horizontal (that is, 20 to 35 degrees below horizontal). An example of such angled installation is shown in FIG. 11.

In another variation, lid portion 108 can include a splash guard around the seal surrounding the injection pin. For example, the splash guard can include a wall depending downwardly from base plate 300, towards base portion 104.

Figure 12:
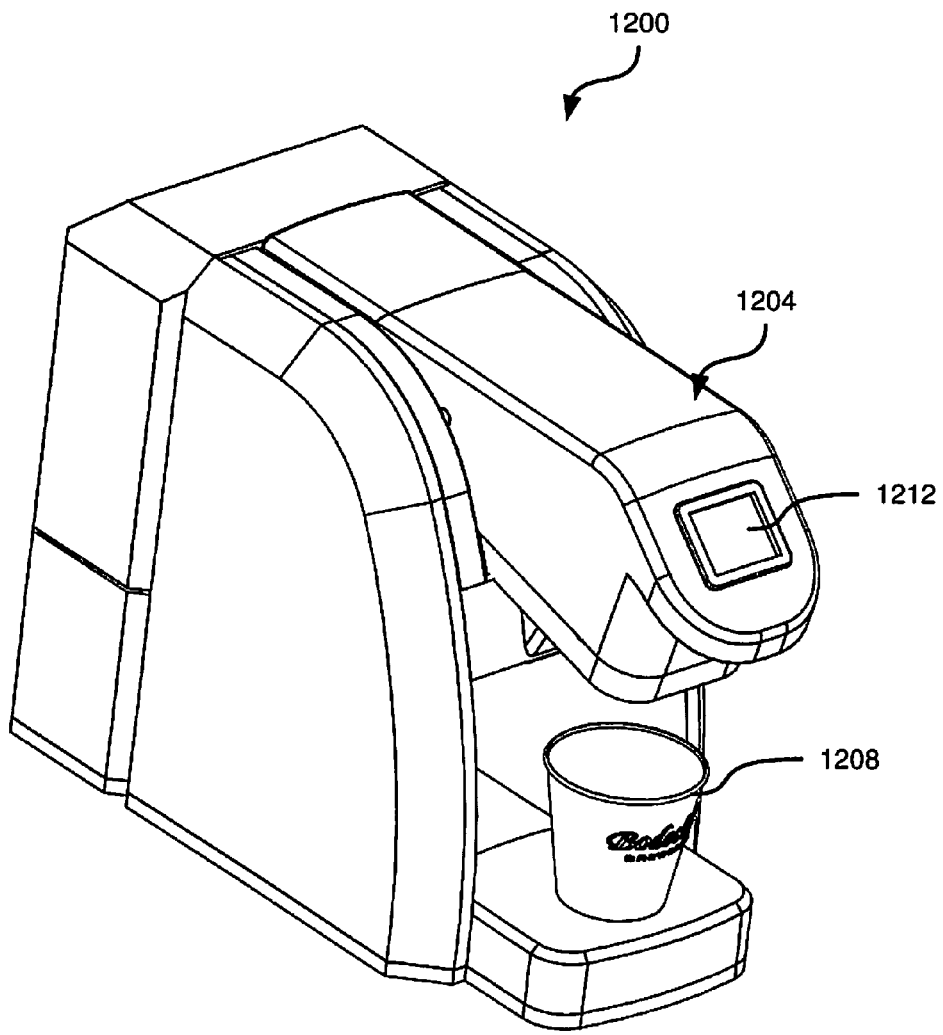
FIG. 12 depicts an isometric view of a brewing apparatus with a head assembly according to another non-limiting embodiment.

Turning now to FIG. 12, a further variation of head assembly 100 will be described. FIG. 12 illustrates a brewing apparatus 1200 including a head assembly 1204 (also referred to as head 1204). Brewed liquid exiting from head 1204 is collected in a cup 1208. As mentioned above, head 1204 is angled downwardly from the horizontal; such an orientation can improve the ergonomics of operating head 1204. In other embodiments, however, head 1204 can be placed horizontally. Brewer 1200 also includes a display 1212, such as an LCD display, which can be used to present and select brewing options and the like.

Figure 13:
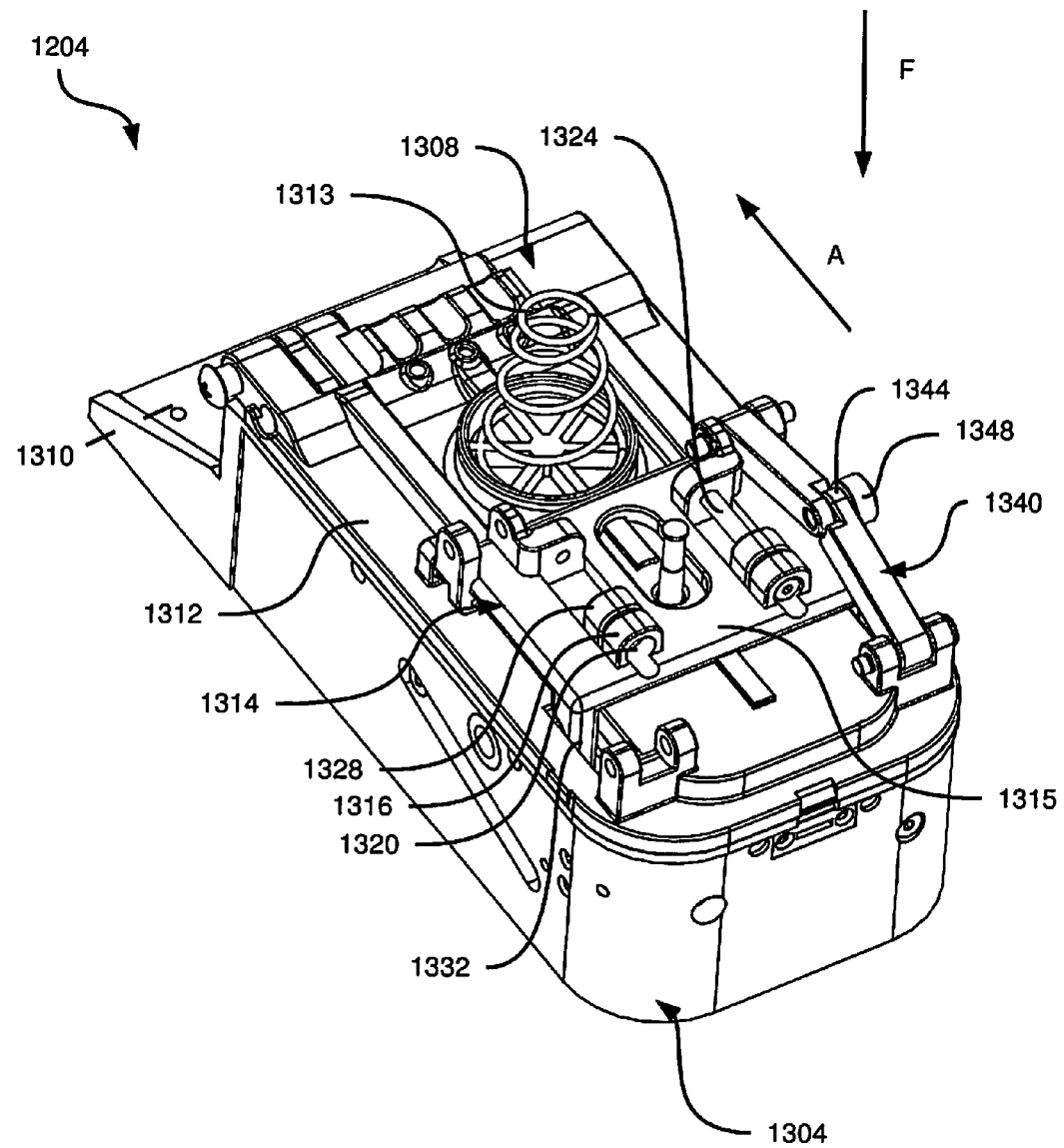
FIG. 13 depicts an isometric view of the head assembly of FIG. 12, according to a non-limiting embodiment.

Head 1204 is shown in isolation from the remainder of brewer 1200 in FIG. 13. A cover (to be discussed in greater detail below) of head 1204 is also omitted in FIG. 13, to show the internal components of head 1204. In particular, head 1204 includes base portion 1304 fixed to the remainder of brewer 1200, and having substantially the same components and structure as base portion 104, described above. Certain minor differences between base portion 1304 and base portion 104 will be discussed further below.

Head 1204 also includes a lid portion 1308. Lid portion 1308 is coupled to base portion 1304, and is rotatable about an axis 1310 between an open position for receiving a cartridge, and a closed position for sealing the cartridge within the apparatus (specifically, within head 1204). Axis 1310 is provided by a hinge connecting lid portion 1308 to base portion 1304.

Lid portion 1308 includes a base plate 1312, which is substantially as described above in connection with base plate 300. Lid portion 1308 also includes a spring 1313 connected to base plate 1312 and extending upwards from base plate 1312, as well as a lock 1314. Lock 1314 includes a planar member 1315 and raised members 1316 with eyeholes 1320, as described above in connection with planar member 315, and raised members 1316 defining eyeholes 320, respectively. Raised members 1316 are configured to receive bars 1324 (only one shown in FIG. 13) which pass through corresponding raised members 1328 fixed to base plate 1312. Hooks 1332 (one shown in FIG. 13) depend from planar member 1315 in the same manner as hooks 332 described above, for extending through apertures in base plate 1312 and engaging with structures of base portion 1304.

Thus, lock 1314 is slideably coupled to base plate 1312 in the same manner as lock 312 was coupled to base plate 300. Lock 1314 is therefore slideable between a locked position and an unlocked position, as discussed earlier. However, the actuation of lock 1314 differs somewhat from that of lock 312. Rather than tower 304 and lever 308, lock 1314 is actuated by a pair of articulated arms 1340 (only one shown in FIG. 13 to avoid obstructing the view of other parts). Each arm 1340 is connected at one end to base plate 1312, and at an opposing end to lock 1314 (for example by way of raised members and pins). Arm 1340 has a joint or hinge 1344 in between the two ends, allowing arm to bend about hinge 1344. A downwards force "F" applied to arm 1344 thus straightens arm 1344, pushing lock 1314 into the locked position (since the end coupled to base plate 1312 near the front of head 1204 cannot move, the end of arm 1344 coupled to lock 1314 moves). Such a force can be applied, for example, to a roller bearing 1348 connected to arm 1340 at hinge 1344. Removing the force "F" allows arms 1340 to bend and lock 1314 to slide back towards the unlocked position. Lock 1312 can be biased, for example by springs (not shown), towards the unlocked position.

The force mentioned above for sliding lock 1314 into the locked position is supplied by movement of a cover 1400, illustrated in FIGS. 14A and 14B. Cover 1400 is rotatable with respect to base portion 1304 about the same axis 1310 as lid portion 1308. For example, fasteners can be used to connect cover 1400 to base portion 1304 by extending through apertures 1404 shown in FIG. 14B. As seen in FIG. 12, cover 1400 supports display 1212.

FIG. 14A shows a bottom view of cover 1400, and reveals that cover 1400 includes a pair of ledges 1408 extending downwardly and into the interior of cover 1400. FIG. 14B shows the protrusion of one of ledges 1408 into the space within cover 1400 more clearly. As will now be apparent, when cover 1400 is connected to the remainder of head 1400 as shown in FIG. 12, ledges 1408 are disposed above arms 1340, and specifically above roller bearings 1348. Thus, downwards motion of cover 1400 in relation to lid portion 1308 results in ledges 1408 contacting and applying downwards pressure on roller bearings 1348.

It will also now be apparent that as in the case of cover 500, cover 1400 is permitted to move independently of lid portion 1308 to a certain degree. FIGS. 14A and 14B show a recession 1416 defined by the interior wall of cover 1400, for receiving an end of spring 1313. Spring 1313 is therefore connected at one end to base plate 1312, and at the other end to cover 1400. Thus, when lid portion 1308 is in the open position, downwards pressure on cover 1400 is transferred to lid portion 1308 via spring 1313 until lid portion 1308 contacts base portion 1304 (that is, until lid portion 1308 reaches the closed position). Cover 1400 subsequently continues to move downwards, compressing spring 1313 and moving lock 1314 to the locked position. Cover 1400 can be held in its closed position by a latch 1420 shown in FIGS. 14B and 14C. Latch 1420 includes a catch 1424, which engages base portion 1304, and a button 1428 which, when pressed, rotates latch relative to cover 1400 about a hinge point 1432, releasing catch 1424.

When catch 1424 is released, spring 1313 (which was compressed during the closing of cover 1400) pushes cover 1400 upwards relative to lid portion 1308, allowing lock 1314 to release (that is, slide to the unlocked position). Lid portion 1308 and cover 1400 can then be rotated upwards together, bringing lid portion 1308 towards the open position to receive another cartridge. The same cartridge ejection functionality described above in connection with head 100 is provided to head 1200.

Figure 15:
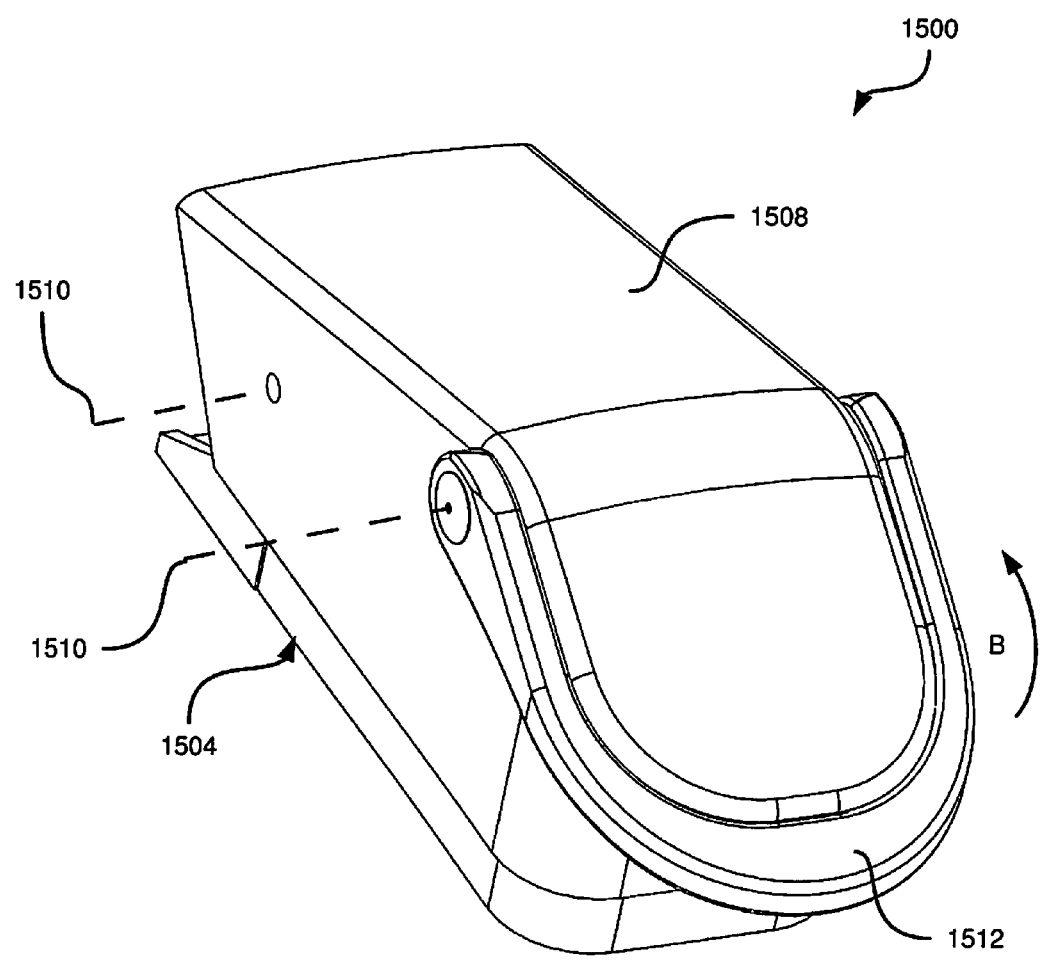
FIG. 15 depicts an isometric view of a head assembly for a brewing apparatus according to a further non-limiting embodiment.

Turning now to FIG. 15, another variation of head assembly 100, and particularly of the locking mechanism, will be described. FIG. 15 shows a head assembly 1500, omitting the brewing apparatus to which head assembly 1500 is mounted. The nature of the brewing apparatus is not particularly limited. For example, head assembly 1500 can be used with brewing apparatus 1200, in place of head assembly 1204.

Head assembly 1500 includes a base portion 1504 which is as described above in connection with base portion 104. Head assembly 1500 also includes a cover 1508 which, like cover 1400, is rotatable relative to base portion 1504, about an axis 1510 (similar to axis 1310 shown in FIG. 13). Coupled to cover 1508 is a handle 1512. Handle 1512 is rotatable relative to cover 1508 about an axis 1514 (defined, for example, by fasteners coupling handle 1512 to cover 1508).

Figure 16:
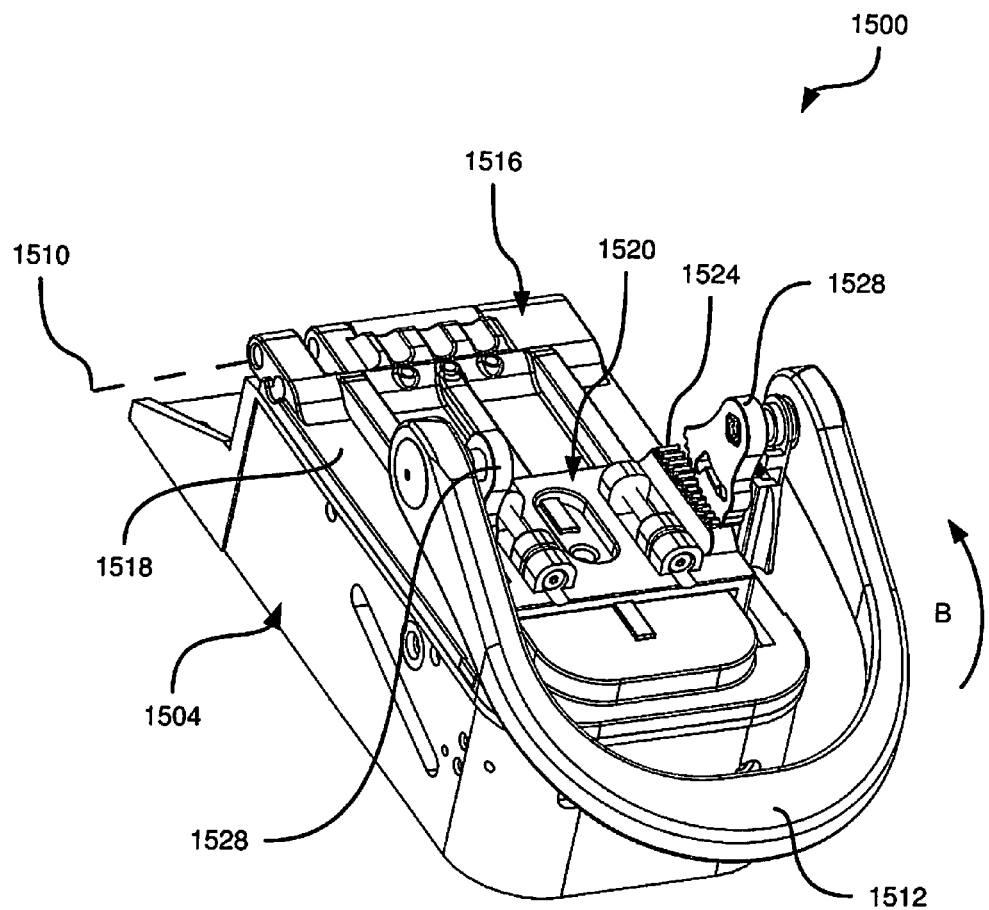
FIG. 16 depicts an isometric view of certain components of the head assembly of FIG. 15, according to a non-limiting embodiment.

Referring to FIG. 16, head assembly 1500 is shown with cover 1508 omitted to reveal a lid portion 1516. Lid portion 1516 is connected to base portion 1504, and rotates relative to base portion 1504 (for example, about axis 1510) between open and closed positions, as discussed earlier. Lid portion 1516 is shown in the closed position in FIG. 16. Lid portion 1516 is also connected to cover 1508, such that cover 1508 and lid portion 1516 move together about axis 1510. However, some motion is permitted between cover 1508 and lid portion 1516, as will be discussed below.

Lid portion 1516 includes a base plate 1518 with features similar to those of base plate 300 discussed above (pylons 314 are not shown, but can be included in embodiments where lid portion 1516 is biased towards the open position using springs connected to base portion 1504). Base plate 1518 supports a sliding lock 1520. Lock 1520 is slideable between locked and unlocked positions as discussed above in connection with locks 312 and 1314, and is connected to base plate 1518 using raised members and bars, as discussed in connection with locks 312 and 1314. Further, lock 1518 includes hooks (not shown) similar to hooks 332 for engaging base portion 1504 in the locked position.

The mechanism provided to slide lock 1520 between the locked and unlocked positions, however, differs from those discussed previously. Specifically, lock 1520 includes a pair of toothed racks 1524 (one rack obscured by handle 1512 in FIG. 16) on an upper surface thereof. For each rack 1524, a pinion gear 1528 is fixed to handle 1512, such that gear 1528 rotates with handle 1512. Gear 1528 includes teeth configured to engage with the teeth of rack 1524, and as a result, when handle 1512 is rotated, gear 1528 also rotates, and the engagement of gear 1528 with rack 1524 causes rack 1524 to slide along base plate 1518.

Thus, it will now be apparent that from the position shown in FIGS. 15 and 16, lifting handle 1512 in the direction "B" will first release lock 1520 by rotating gears 1528 and sliding lock 1520 to the unlocked position. Further movement of handle 1512 in direction "B" results in handle 1512 and cover 1508 moving together about axis 1510, to bring lid portion 1516 to the open position. Closing and locking lid portion 1516 reverses the above process: downwards pressure applied to handle 1512 rotates handle 1512 and cover 1508 together about axis 1510 until lid portion 1516 reaches the closed position. Subsequently, continued pressure on handle 1512 rotates handle 1512 relative to cover 1508, causing lock 1520 to slide to the locked position.

In the embodiment shown in FIGS. 15 and 16, therefore, handle 1512 is permitted a certain degree of movement independent of cover 1508 and lid portion 1516. The extent to which handle 1512 can rotate about cover 1508 independently of the rotation of cover 1508 about base portion 1504 is determined by structures associated with gears 1528.

Figure 17A:
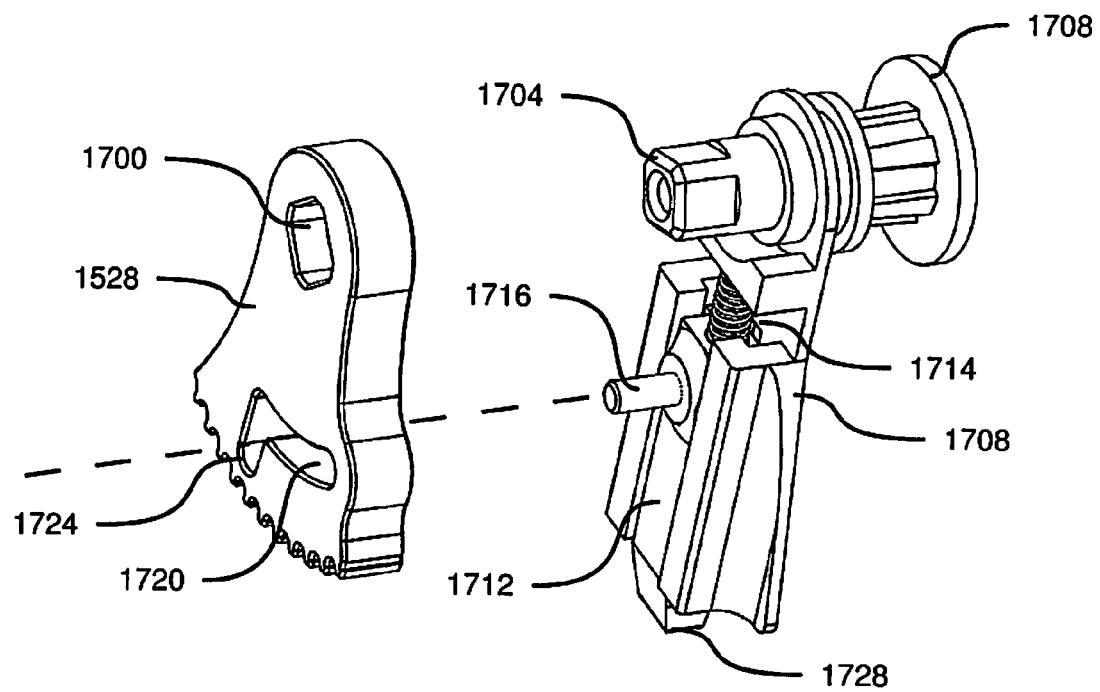
FIGS. 17A and 17B depict isometric views of a pinion gear and associated components from the head assembly of FIG. 15, according to a non-limiting embodiment.
Figure 17B:
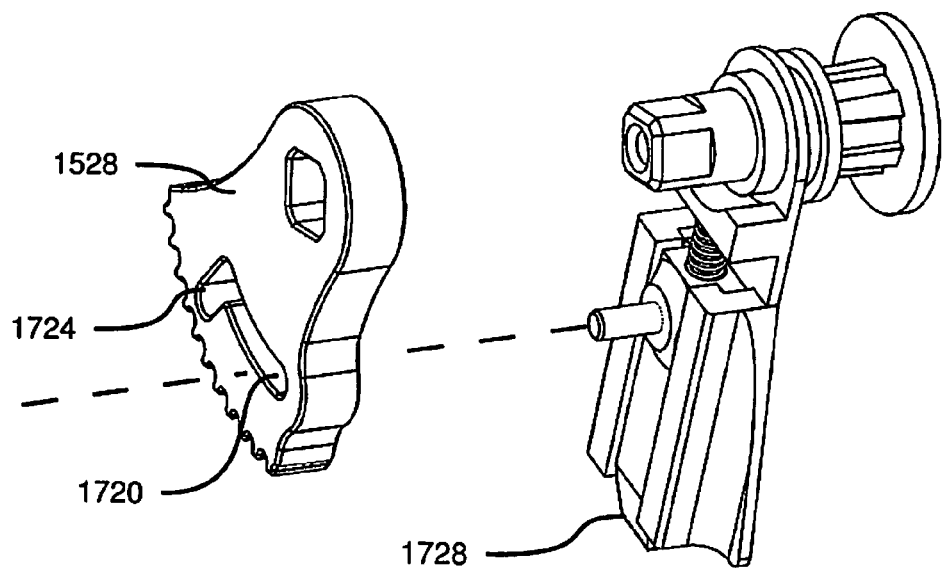

Referring now to FIG. 17A, gear 1528 and associated components are shown in greater detail. Gear 1528 is fixed to handle 1512 by way of an aperture 1700 which receives an axle 1704. Axle 1704 is in turn fixed to a fastener 1708, to which handle 1512 (not shown) is fixed. Axle 1704 and fastener 1708 are rotatably connected to a track 1708, which is fixed to the interior of cover 1508. Track 1708 defines a channel in which a bolt 1712 is configured to slide between raised and lowered positions. FIG. 17A shows bolt 1712 in the lowered position, while FIG. 17B shows bolt 1712 in the raised position. Bolt 1712 is biased towards the lowered position by a spring 1714 connecting bolt 1712 and track 1708.

Bolt 1712 includes a pin 1716 protruding outwards, towards gear 1528. Gear 1528 includes a slot 1720 defined therein (slot 1720 extends through gear 1528 in the illustrated embodiment, but in other embodiments slot 1720 can be implemented as a groove that does not extend straight through gear 1528), which receives pin 1716. At one end, slot 1720 is angled to provide a pit 1724. As seen in FIG. 17A, when bolt 1712 is in the lowered position, pin 1716 extends into pit 1724, thus preventing rotation of gear 1528. Because gear 1528 cannot rotate, axle 1704, fastener 1708 and handle 1512 are also prevented from rotating.

Rotation of gear 1528 and handle 1512 is enabled when bolt 1712 is displaced upwardly, into the raised position. Such displacement occurs when a lower end 1728 of bolt 1712 contacts base plate 1518 of lid portion 1516 as lid portion 1518 and cover 1508 rotate towards the closed position. Once lid portion 1518 has reached the closed position, cover 1508 continues to rotate about axis 1510, thus pressing lower end 1728 of bolt 1712 onto base plate 1518. As a result, spring 1714 is compressed and bolt 1712 slides from the lowered position to the raised position, shown in FIG. 17B. Pin 1716 is thus raised out of pit 1724, and permitted to slide along slot 1720. Handle 1512 is therefore freed to rotate relative to cover 1508, which causes gear 1528 to rotate (see FIG. 17B), sliding lock 1520 to the locked position.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A head assembly for a brewing apparatus, comprising:
   (a) a movable lid portion having a top surface, a bottom surface and an opening therethrough;
   (b) a fixed base portion having a brewing cartridge opening and a top surface, a bottom surface and an opening therethrough, the moveable lid portion being rotatable between an open position for receiving the brewing cartridge, and a closed position for sealing the brewing cartridge between the fixed base portion and the moveable lid portion;
   (c) a slideable lock having a first end coupled to the top surface of the moveable lid portion and having a second end of the slideable lock terminating in a hook and extending through the opening in the moveable lid portion and the opening in the fixed base portion to provide a locked position for engaging the bottom surface of the fixed base portion when the moveable lid portion is in the closed position, and an unlocked position for releasing the bottom surface of the base portion;
   (d) an axis point connected to the moveable lid portion, for moving the slideable lock between the locked and unlocked positions; and
   (e) a cover or a handle movably coupled to the first portion of the slideable lock such that pressure on the cover or handle rotates the moveable lid portion to the closed position, and slides the lock into the locked position.

2. The brewing apparatus of claim 1 wherein the moveable lid portion further comprises a lever, a base plate and a support tower extending upwards from the base plate, the support tower rotatably supporting the lever at a second axis point.

3. The brewing apparatus of claim 2 wherein one end of the lever has a bearing surface for facilitating motion of the second end against the cover.

4. The brewing apparatus of claim 3 wherein the bearing surface is provided by a roller bearing.

5. The brewing apparatus of claim 1 wherein the moveable lid portion is biased towards the open position.

6. The brewing apparatus of claim 1 wherein the slideable lock is biased towards the unlocked position.

7. The brewing apparatus of claim 1, further comprising an injection pin connected to the lid portion for piercing the brewing cartridge in the closed position.

8. The brewing apparatus of claim 1, further comprising:
   a cartridge holder rotatably mounted within the fixed base portion and having a resting position for receiving the brewing cartridge, and an ejection position for ejecting a spent brewing cartridge.

9. The brewing apparatus of claim 8, further comprising:
   an arm having a first end fixed to the moveable lid portion and a second end configured to contact the cartridge holder;
   wherein movement of the movable lid portion from the closed position to the open position causes movement of the arm for contacting the cartridge holder and rotating the cartridge holder to the ejection position.

10. The brewing apparatus of claim 9 wherein the arm is configured to contact a dog rotatably connected to the cartridge holder, and wherein the dog is configured to resist rotation in a first direction for causing the cartridge holder to rotate, and then to rotate in an opposite second direction.

11. The brewing apparatus of claim 1, further comprising:
    a shuttle supporting an extraction pin and slideably mounted within the fixed base portion, the shuttle having a resting position and a brewing position for piercing a cartridge with the extraction pin;
    wherein the hook is configured to engage the shuttle for sliding the shuttle to a brewing position.

12. The brewing apparatus of claim 11 wherein the extraction pin has a bend therein.

13. A head assembly for a brewing apparatus, comprising:
    (a) a fixed base portion;
    (b) a movable lid portion having a top surface, a bottom surface and an opening therethrough, the moveable lid portion coupled to the fixed base portion, the moveable lid portion being rotatable between an open position for receiving a brewing cartridge, and a closed position for sealing the cartridge between the moveable lid portion and the fixed based portion;
    (c) a lock having a first end slideably coupled to the top surface of the moveable lid portion and a second end of the lock extending through the opening in the moveable lid portion to provide a locked position for engaging the fixed base portion when the lid portion is in the closed position, and an unlocked position for releasing the base portion;
    (d) an articulated arm having a first end connected to the first end of the lock, an opposing second end of the articulated arm connected to the moveable lid portion, and a hinge between the first end and the second end, the articulated arm being configured to articulate about the hinge between a bent position for placing the lock in the unlocked position, and a straightened position for placing the lock in the locked position; and
    (e) a cover movably coupled to the moveable lid portion and configured for abutting the articulated arm adjacent to the hinge when the moveable lid portion is in the closed position, such that pressure on the cover rotates the moveable lid portion to the closed position, and subsequently displaces the articulated arm to the straightened position.

14. The head assembly of claim 13, comprising a second articulated arm having a first end connected to the lock, an opposing second end connected to the moveable lid portion, and a hinge between the first end and the second end.

15. The head assembly of claim 13, the cover having an internal ledge configured to contact the articulated arm adjacent to the hinge.

16. The head assembly of claim 13, further comprising a spring having a first end connected to the moveable lid portion and a second end connected to an inside wall of the cover, wherein the spring is compressed when the moveable lid portion is in the closed position and the lock is in the locked position.

17. A head assembly for a brewing apparatus, comprising:
    (a) a fixed base portion;
    (b) a movable lid portion having a top surface, a bottom surface and an opening therethrough coupled to the fixed base portion, the moveable lid portion being rotatable between an open position for receiving a brewing cartridge, and a closed position for sealing the cartridge between the moveable lid portion and the fixed base portion;
    (c) a lock having a first end slideably coupled to the top surface of the moveable lid portion and a second end of the lock extending through the opening in the moveable lid portion to provide a locked position for engaging the fixed base portion when the moveable lid portion is in the closed position, and an unlocked position for releasing the fixed base portion; the lock having a toothed rack disposed on the first end thereof;
    (d) a cover or handle movably coupled to the first end of the lock with a pinion gear configured to engage the toothed rack, such that rotation of the cover or handle relative to the fixed base portion rotates the pinion gear and slides the lock to the locked position or the unlocked position on the fixed base portion.

18. The head assembly of claim 17, further comprising:
a track affixed to an interior surface of the cover and defining a channel;
a bolt slideable within the channel between a raised position and a lowered position, and having a pin extending into a slot defined within the pinion gear;
the slot including a pit, for receiving the pin when the bolt is in the lowered position and preventing rotation of the pinion gear and handle.

19. The head assembly of claim 1 wherein the slideable lock is locked and unlocked by a tower and cover combination, a lever and cover combination or a handle and rack and pinion combination.

20. The brewing apparatus of claim 19 wherein the first end of the slidable lock is a planar member and the hook of the lock includes a pair of hooks depending from opposing sides of the planar member, the planar member being slidably coupled to the moveable lid portion.

* * * * *